United States Patent [19]

Nishibori

[11] Patent Number: 5,225,536
[45] Date of Patent: Jul. 6, 1993

[54] PARTICLES OF GELATIN AND AMINO ACID TO BE BLENDED IN RESINS

[76] Inventor: Sadao Nishibori, 1-9-206 Higashi Shinagawa, 1-chome, Shinagawa-ku, Tokyo, Japan

[21] Appl. No.: 550,893

[22] Filed: Jul. 11, 1990

[30] Foreign Application Priority Data

Aug. 16, 1989 [JP] Japan .................. 1-210098
Dec. 26, 1989 [JP] Japan .................. 1-335043

[51] Int. Cl.⁵ .................. C07K 15/06; C08J 9/26
[52] U.S. Cl. .................. 530/354; 521/61; 521/62; 521/841; 521/102
[58] Field of Search .................. 530/354, 355; 521/102, 521/84.1, 62, 61

[56] References Cited

U.S. PATENT DOCUMENTS

| | | | |
|---|---|---|---|
| 976,827 | 11/1910 | Ostberg . | |
| 1,302,463 | 4/1919 | Campbell . | |
| 1,823,754 | 9/1931 | Nitta . | |
| 1,954,462 | 4/1934 | Tainton | 241/16 X |
| 2,002,792 | 5/1935 | Sart | 41/24 |
| 2,039,262 | 4/1936 | Schulte | 18/54 |
| 2,069,568 | 2/1937 | Wieder | 241/16 X |
| 2,257,726 | 10/1941 | Emmitt | 83/94 |
| 2,433,727 | 12/1947 | Arnold | 18/48 |
| 3,157,524 | 11/1964 | Artandi | 106/122 |
| 3,598,687 | 8/1971 | Elie | 161/64 |
| 3,654,865 | 4/1972 | Tamai | 430/112 |
| 3,663,472 | 5/1972 | Raymond | 260/6 |
| 3,665,061 | 5/1972 | Eberly, Jr. | 264/49 |
| 3,692,523 | 9/1972 | Tamai et al. | 430/119 |
| 3,756,518 | 9/1973 | Bailey | 241/65 |
| 3,788,845 | 1/1974 | Osawa et al. | 430/97 |
| 3,925,863 | 12/1975 | Meyer | 26/1 |
| 4,057,607 | 11/1977 | Soehngen et al. | 264/28 |
| 4,221,342 | 7/1980 | Tadema et al. | 241/DIG. 14 |
| 4,235,959 | 11/1980 | Thijs et al. | 430/531 |
| 4,287,252 | 9/1981 | Dimiter | 428/316 |
| 4,544,676 | 11/1985 | Gyurkó et al. | 521/84.1 |
| 4,834,762 | 5/1989 | Nishibori | 8/94.1 |
| 5,080,292 | 1/1992 | Nishibori | 530/355 |

FOREIGN PATENT DOCUMENTS

62-221357 9/1987 Japan .
63-154765 6/1988 Japan .
586232 3/1947 United Kingdom .

OTHER PUBLICATIONS

JP 62-221357 (Translation).
JP 63-154765 (Translation).
Strong, Kingzett's Chemical Encyclopedia, 7th Ed. (Nostrand Co., Inc. N.Y.) 1946 pp. 432–433.
WPI Abstract, JP 1192874 Ain KK Aug. 1989.
WPI Abstract, JP 1186320 Ein KK Jul. 1989.
WPI Abstract, JP 63-154765 Ain KK Jun. 1988.
WPI Abstract, JP 62-221357 Jex KK Sep. 1987.
World Patent Index Abstract, JP 2091279 Kokoku Chem. Ind. KK Mar. 1990.
WPI Abstract, JP 1294740 Ain KK Nov. 1989.
WPI Abstract, JP 1222954 Ain KK Sep. 1989.
WPI Abstract, JP 1222938 Ain KK Sep. 1989.

*Primary Examiner*—Jeffrey E. Russel
*Attorney, Agent, or Firm*—Shlesinger Arkwright & Garvey

[57] ABSTRACT

Fine particles of gelatin and amino acid used in the present invention are particularly suitable for use in combination with resins.

Gelatin particles used in the present invention have the number-average molecular weight of 8,500 or less, and amino acid particles with the number-average molecular weight of 200 or less, so that efficient pulverization becomes possible and that gelatin and amino acid particles maintain their intrinsic properties as they are not subject to denaturation during pulverization. Resultant particles are neither too large nor too small but are uniform in size and are particularly suitable for use in combination with resins.

3 Claims, 2 Drawing Sheets

FIG. 1

PARTICLES OF GELATIN AND AMINO ACID TO BE BLENDED IN RESINS

This invention relates to fine particles of gelatins and amino acids to be blended in natural or synthetic resins. More particularly, it relates to particles of gelatins and amino acids to be used in combination with resins to prepare paints, coating layers, moldings, and porous coating layers obtained by eluting said gelatin or amino acid particles contained in the coating layers.

BACKGROUND OF THE INVENTION

In order to modify coating layers of natural or synthetic resins, attempts are made to add various modifiers to the resin matrix or to impart a porous structure to the coating layer.

A typical method of forming a porous coating layer comprises the steps of forming a resinous solution by dissolving polyurethane resin with a water soluble solvent, coating the substrate with the resin solution, immersing the substrate in water to solidify and remove the solvent with water.

Porous coating layers can also be obtained by blending polyurethane resin with water and solvent to form a W/O type emulsion, coating the emulsion on a substrate and evaporating the water and the solvent by drying.

These methods are defective in that they involve special equipment and processes, that the porous structure in the coating layer is easily breakable, that the pores in the porous structure do not exhibit sufficient permeability, or that the types of resin that can be used are limited.

In order to obtain porous coating layers of this type, it has been attempted to blend the resin with particles that can be eluted, such as particles of sodium chloride, calcium chloride, sodium carbonate and sugar, and to subsequently remove the particles using water.

Use of water soluble particles such as of sodium chloride enables manufacture of porous coating layers such as films, laminates or sheets of paint or coating using the conventional methods and facilities for producing paints, coatings, etc. in general. It also enables manufacture of resin films, sheets, and various other resin moldings using the conventional molding methods and facilities.

Any and all types of resin that can be used in paints, coatings, etc. can be used to obtain porous coating layers of this type, and the resultant coating layers exhibit strength that is comparable to other coatings in general.

Further, the diameter and the number of pores in the porous coating layers can be suitably controlled by controlling the particle size and the amount of particles to be blended with the resin matrix. This in turn facilitates production of coating layers with desired permeability.

However, porous coating layers obtained by blending resins with particles of sodium chloride, calcium carbonate, calcium chloride or sugar and by eluting the particles with water do not exhibit sufficient permeability nor are they advantageous in terms of modification of the resin matrix.

It is assumed that the insufficient permeability is attributable to the fact that the "pores" in the coating layer are not fully expanded but are present as mere voids after elution of particles.

Based on the above assumption, the present inventors have made an attempt to obtain porous coating layers with modified properties by using gelatin which contain as the principal component proteins having excellent affinity with resins.

An advantage derived from the use of gelatin in combination with natural or synthetic resin to obtain coating layers lies in the moisture absorbing and permeating properties of the gelatin contained therein, which impart to the coating layer excellent moisture absorption and excellent feel without stickiness. Resin coating layers blended with gelatin are also excellent in contact resistance at the surface and are therefore high in adhesion. Coating layers blended with gelatin are further superior in weatherability, particularly cold resistance and are static-free.

By eluting gelatin particles blended in the resin coating layers with cold or warm water, porous coating layers with excellent moisture and air permeability can be obtained.

Elution of gelatin particles blended in the resin coating layers with cold or warm water results in "pores" that are fully expanded; more particularly, even if the pores at the surface are small in diameter, they are sufficiently expanded inside and have larger diameter, imparting to the coating layers high permeability for their resistance against water pressure.

It is noted that very small dents are formed on the surface of expanded pores formed inside the coating layer which, together with the pore openings at the surface, contribute to giving the surface of the coating layer soft texture and good feel without stickiness. These dents also cause irregular reflection of the light incident on the surface.

However, gelatin powders that are commercially available are irregular and often too large in the particle size. When such commercial gelatin powders are used as they are, the pores in the resultant coating layers become too large, and the water pressure resistance as against the required permeability becomes insufficient. Use of gelatin powder with large particle size also results in thick layer of coatings, and coating layers with required air and moisture permeability cannot be obtained.

Repeated experiments by the inventors suggest that gelatin particles to be blended in the coating layers are preferably very fine and are within a given range of particle size.

The inventors made an attempt for mass production of very fine gelatin particles using commercial gelatins and a jet mill.

Pulverization of gelatin in a jet mill enables concurrent classification of powder, and is therefore suitable for obtaining powder with particle size distributed within a given range.

However, use of jet mill for pulverization of gelatin is defective in that pulverized particles tend to become fused or coagulated, making pulverization itself impossible or causing the pulverized particles to adhere to the inner surface of the mill.

The inventors then tried to pulverize gelatin powder from which moisture content was removed as much as possible in a mill wherein the humidity was kept as low as possible. These improvements in the pulverization process made it possible to pulverize and classify gelatin powder into very fine particles within a given range of particle size.

The improved pulverization process using jet mill is still defective in that the yield of pulverization is too small to be employed in practical application. The improved process is further defective in that the gelatin particles tend to become denatured because of the prolonged process and because moisture is further removed from gelatin during pulverization, making elution with warm or cold water impossible.

Further attempt was made by the inventors to use wet ball mill, in which gelatin powder is charged together with organic solvent such as dimethylformamide and wherein the atmosphere is kept dry.

Efficient pulverization was possible in the wet ball mill, with gelatin particles not becoming coagulated or adhered to the inner wall of the pulverizer when the water content of gelatin powder during pulverization was kept at a low level.

Pulverization in the wet ball mill was still defective in that the particle sizes after pulverization were widely varied, and those as large as the starting material at the time of charging and those having very small particle size of 1.5 μm or smaller were both present at certain ratios.

Although the mean particle size can be arbitrarily reduced by suitably adjusting the pulverization conditions, individual particles would vary widely in size to thereby make the particles not suitable for practical use.

Pulverization in the wet ball mill for an extended period of time would produce particles with smaller sizes, but this prolonged pulverization would also produce "over-pulverized" particles as well.

The over-pulverized particles, particularly those having the particle size of 1 μm or smaller would fail to exhibit properties that are unique to gelatin when they are blended with resin, or cannot be eluted from the resultant coating layer with water. Gelatin powder pulverized in the wet ball mill containing a large amount of over-pulverized particles is not suitable for practical use.

Upon repeated experiments, the inventors have succeeded in developing particles of gelatins and amino acids that are efficiently pulverized to particle sizes in a given range and that can be eluted with cold or warm water to give the coating layers various functions imparted by the gelatin powder blended with resins mentioned above.

OBJECTS AND SUMMARY OF THE INVENTION

A main object of the present invention is to provide particles of gelatins and amino acids that can be mass produced at low cost and high efficiency and that can be blended with resins.

Another object of the present invention is to provide particles of gelatins and amino acids within a given range of size.

Still another object of the present invention is to provide particles of gelatins and amino acids that are not denatured in the course of pulverization despite full pulverization to very fine particles and that impart to the coating layers which contain the particles excellent moisture absorption and permeation.

Still another object of the invention is to provide gelatin particles having the mean particle size of from 3 μm to 5.5 μm, so that very fine films of paint, coating or adhesive containing the gelatin particles can be obtained.

Still another object of the invention is to provide gelatin particles containing less than 10 wt % of particles as against the total amount that are larger than 9 μm in size, so as to avoid formation of too large a pore on the surface of the coating layer and in turn to avoid lowering of water pressure resistance or to avoid the surface of the coating layer from becoming brittle.

Still another object of the present invention is to provide gelatin particles containing less than 10 wt % of particles smaller than 1.5 μm in size as against the total amount, so that gelatin particles contained in the coating layer would not come out on its surface and that those gelatin particles defective in terms of moisture absorption or permeation would not remain on the surface.

In summary, to achieve these objects, the present invention is characterized in that gelatin particles to be blended in resins are obtained by dry process pulverization which classifies the particles into a given range of sizes, that the mean molecular weight (number-average molecular weight) of the particles is less than 8,500, that the typical mean particle size is any arbitrary value in the range of from 3 μm to 5.5 μm, that the ratio of particles larger than 9 μm in size is typically less than 10 wt % of the total amount of the gelatin particles, and that the ratio of particles smaller than 1.5 μm in size is typically less than 10 wt % of the total amount of the particles.

According to the present invention, amino acid powder to be blended with resins is pulverized into fine particles of 200 or less in the mean molecular weight (number-average molecular weight). A typical example of amino acid particles is obtained by dry process pulverization and is classified into particles within a given range of sizes.

Particles of gelatins and amino acids according to the present invention are most suitable for use in combination with resins. Other objects and features of the present invention will become apparent from the following detailed description and the scope of claims.

BRIEF DESCRIPTION OF THE DRAWINGS

In the accompanying drawings.

In the graph shown in FIG. 1, abscissa x represents the mean molecular weight (number-average molecular weight) of the gelatin powder to be pulverized, and the ordinate y the amount of pulverization per hour in kilograms. The ordinate y' represents the mean particle size of gelatin particles after pulverization, the ordinate y'' the amount of particles larger than 9 μm in size in percentage (wt %) as against the total amount of pulverized gelatin particles. The curve A—A in FIG. 1 shows the chronological changes in the amount of pulverization per hour, curve B—B the changes in the mean particle size, the curve C—C changes in the weight ratio of particles having the particle size of larger than 9 μm, respectively.

The graph in FIG. 2 shows the initial distribution of particle sizes in the commercial gelatin powder used for pulverization, the particle size distribution after dry pulverization, and the particle size distribution after wet pulverization. The ordinate represents the amount in wt % and the abscissa the measured particle sizes in μm. The curve D in FIG. 2 shows the particle size distribution of the gelatin powder before pulverization, the curve E the particle size distribution of the gelatin obtained by dry pulverization of the present invention, and the curve F the particle size distribution of the gelatin obtained by the wet pulverization of the present invention, respectively in wt %.

Specific examples of the present invention will now be described.

Gelatin powder to be blended with resins is pulverized in a dry pulverizer such as jet mill and classified into particles within a given range of size by a classifying device. The mean molecular weight of the gelatin powder is less than 8,500.

The term, "mean molecular weight" used in the specification is the number obtained by dividing the total mass of molecules by the total number of molecules. The molecular weight means the mass of molecules expressed in a unit where the mass of $C^{12}$ atom is given as 12.

One example of particle size which is preferable in practical use is any value falling in the range of from 3 $\mu$m to 5.5 $\mu$m (1/1,000 mm is expressed as $\mu$m in this specification), such as 4.32 $\mu$m, 3.89 $\mu$m, 4.44 $\mu$m, and 4.77 $\mu$m.

The particle size is determined by centrifuging a dispersion of gelatin particles in ethanol and measuring its volume. The mean particle size is determined as the size of particles that are distributed in the amount of 50 wt % or more as against the total weight.

The particle size distribution which is preferable in practical use is such that particles larger than 9 $\mu$m are effectively eliminated until they are reduced to an amount less than 10 wt % as against the total amount of the gelatin particles.

The particle size distribution which is further preferable in practical use is such that particles smaller than 1.5 $\mu$m are effectively eliminated until they are reduced to an amount less than 10 wt % as against the total amount of the gelatin particles.

Amino acid powder to be blended with resins is pulverized into very fine particles having the mean molecular weight of 200 or less.

The amino acid powder is preferably pulverized by a dry pulverizer such as jet mill and classified into particles within a given range of size by a classifying device.

A typical example of gelatin powder according to the present invention will now be described in more detail.

Gelatin powder having the mean molecular weight of 8,500 or less is pulverized and classified by dry process pulverization.

Gelatin powder used herein is preferably polypeptide having the molecular weight of 8,500 or less which is obtained by hydrolysis of protein derived from collagen such as commercially available gelatin (gelatin in general such as animal glue) with enzyme, acid or alkali.

More specifically in the present invention, commercial gelatin is hydrolyzed with enzyme, acid or alkali, and jetted from nozzles into hot air of ca. 120° C. and dried to obtain coarse particles of gelatin having the mean molecular weight of 1,000 to 8,500.

Figure 2:
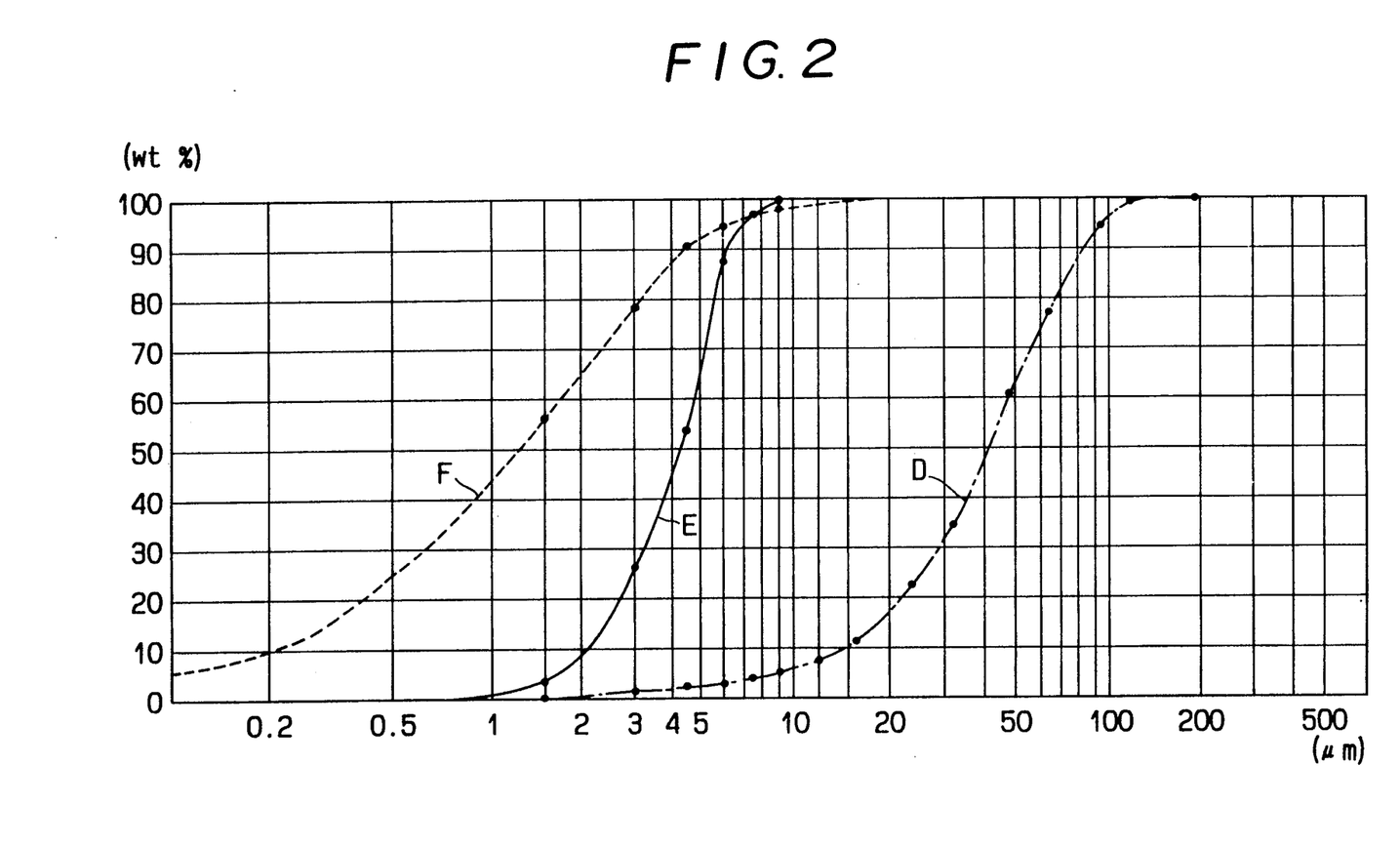

The graph D in FIG. 2 shows one example of typical particle size distribution in coarse gelatin powder as the starting material. The mean particle size is ca. 42 $\mu$m and the maximum 200 $\mu$m.

The gelatin powder thus obtained as the starting material is pulverized into very fine particles using a dry pulverizer such as jet mill.

Gelatin particles having the mean molecular weight of 8,500 or less are significantly superior in pulverization performance than those having the molecular weight of 8,500 or more. Gelatin particles having the mean molecular weight of more than 8,500 are very low in the yield of pulverization per unit hour, and are not suitable for mass production of fine particles at low cost.

Pulverization performance per unit hour of the coarse gelatin powder becomes higher when the mean molecular weight thereof is smaller. Therefore, the mean molecular weight of gelatin to be used in the present invention is preferably smaller than 8,500. Given the yield of pulverization obtained in coarse gelatin powder having the mean molecular weight of 1,000 as 100 wt %, said yield is 84 wt % in gelatin having the molecular weight of 3,000, 60 wt % in gelatin having the mean molecular weight of 5,000, 76 wt % in gelatin having the mean molecular weight of 7,000, and 62 wt % in gelatin having the molecular weight of 8,500.

These figures indicate that coarse gelatin powder having the mean molecular weight of 8,500 can be efficiently pulverized. Gelatin powder having the mean molecular weight of 10,000 is as low as 28 wt % in the yield of pulverization when compared with said gelatin having the molecular weight of 1,000, and 16 wt % in gelatin having the mean molecular weight of 13,000. These are not suitable for practical use.

Higher efficiency of pulverization in gelatin powders having smaller molecular weights is demonstrated by the respective mean particle size distribution of the resultant fine particles. Coarse gelatin powder with the mean molecular weight of 8,500 or less is also preferable because smaller mean particle size can be obtained if the pulverization conditions are otherwise identical.

Given the mean particle size of gelatin powder having the mean molecular weight of 1,000 after pulverization as 100, the mean particle size of gelatin powder having the molecular weight of 8,500 is 110, 135 in gelatin powder having the mean molecular weight of 10,000 and 173 in gelatin powder having the mean molecular weight of 13,000 respectively. As these typical examples of mean particle size indicate, gelatin powders having the mean molecular weight of 8,500 or more are extremely large in the mean particle size despite pulverization and are therefore not suitable for use in the present invention.

The particle size of gelatin powder after pulverization can be determined arbitrarily by changing conditions of pulverization and classification. Thus, in order to obtain fine powder of gelatin that meets the requirements of the target use, the mean particle size as well as the maximum and minimum sizes to be obtained by pulverization are first determined, and the conditions which will give such results are then selected.

The preferable range of mean particle size mentioned above is one of the most typical and practical examples suitable for use in paints and coating solutions. Fine powders of gelatin with larger mean particle sizes may be put to practical use without problem.

Figure 1:
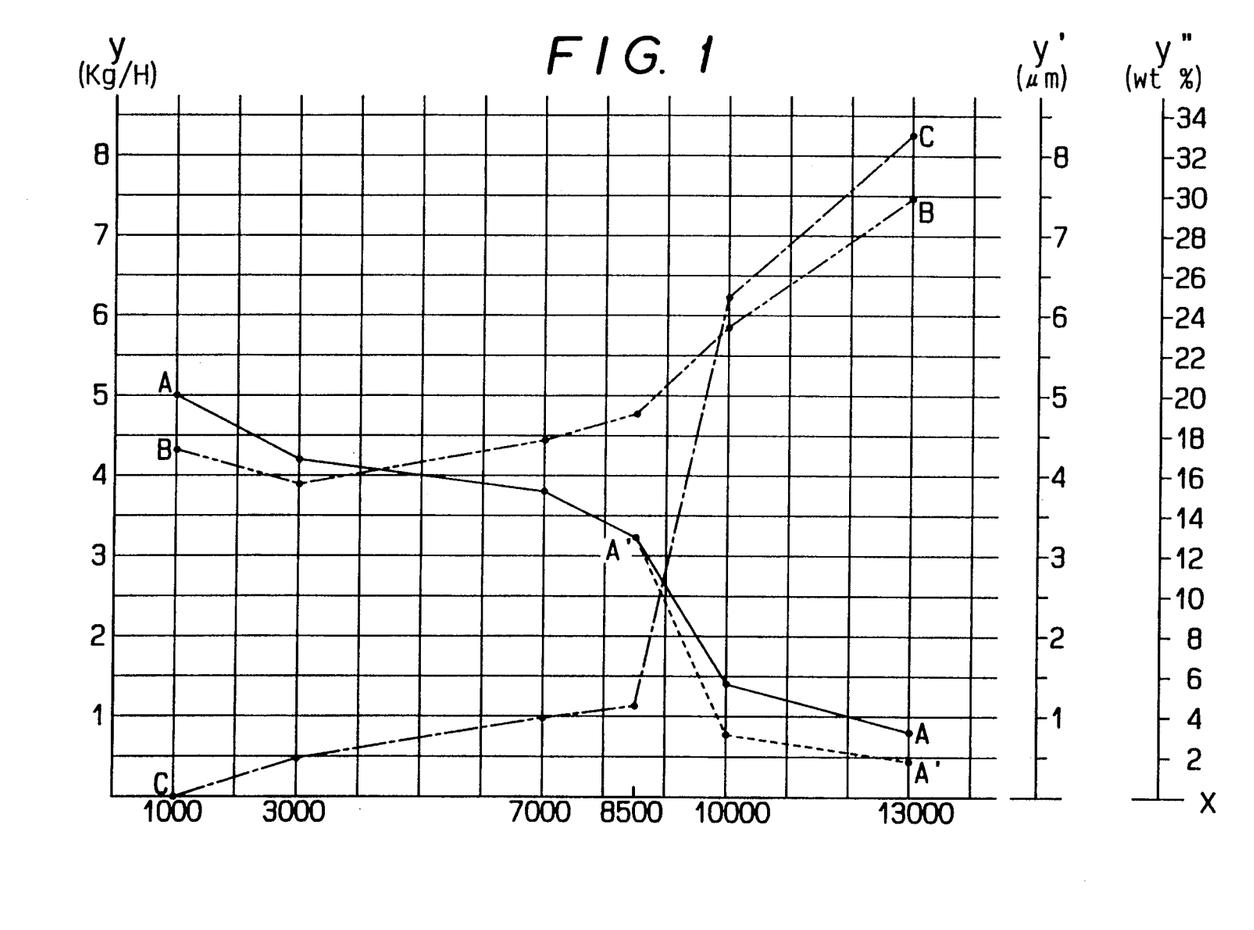
FIG. 1 is a graph to show the amount of pulverization per unit hour, the mean particle size and the amount of particles larger than 9 μm of gelatin particles obtained by pulverization of gelatin powders having the mean molecular weights (number-average molecular weight) of 1,000, 3,000, 7,000, 8,500, 10,000, 13,000 respectively.

With coarse gelatin powders having the mean molecular weight of 8,500 or more, the mean particle size can be reduced by suitably modifying the pulverization conditions, but the yield of pulverization per unit hour further decreases. They are therefore not suitable for practical use although fine particles can be obtained from pulverization of these powders. For example, if coarse gelatin powder having the mean molecular weight of 10,000 is pulverized to have the mean particle size which is comparable to that of gelatin powder having the mean molecular weight of 7,000, the yield of pulverization per unit hour would be as low as 20 when compared with the yield achieved in the gelatin powder having the mean molecular weight of 7,000 which is given as 100. And with gelatin powder having the mean molecular weight of 13,000, the yield is even lower at 12, and these powders are not suitable for practical use. The graph A'—A' in FIG. 1 illustrates the yield of pulverization per unit hour in gelatin powders having the mean molecular weights of 10,000 and 13,000 respectively and the mean particle size which is made smaller.

Reference is now made to amount of particles greater than 9 μm contained in the pulverized gelatin in relation to the mean molecular weight of the starting material gelatin powder.

Coarse gelatin powders having different mean molecular weights were pulverized and classified under identical conditions to compare the amount of particles greater than 9 μm in size after pulverization. The amount is as low as 0 wt % in gelatin having the mean molecular weight of 1,000, 1.9 wt % in gelatin having the mean molecular weight of 3,000, 3.9 wt % in gelatin having the molecular weight of 7,000. and 4.5 wt % in gelatin having the molecular weight of 8,500. On the other hand, the amount is as high as 24.9 wt % in gelatin having the mean molecular weight of 10,000, and 33.0 wt % in gelatin having the mean molecular weight of 13,000 respectively.

Thus, fine powders of gelatin obtained by pulverizing coarse gelatin powder having the mean molecular weight of 8,500 or more is not suitable for practical use as it contains a large amount of larger particles.

Description is now made on amino acid particles to be used in one example. Powder of amino acid used in the example is of the same nature as the gelatin powder and is almost identical in its properties but is more suitable for pulverization than gelatin. Amino acid particles can therefore be used in combination with or in place of said gelatin particles to be blended in resins.

Amino acid particles to be used in the present invention are obtained by pulverizing coarse powder of amino acid having the mean molecular weight of 100-200 which in turn is obtained by hydrolysis of various proteins with enzyme, acid or alkali.

Since coarse powder of amino acid to be used has extremely low molecular weight as compared with the gelatin powder mentioned above, either the dry or wet process pulverization may be employed to obtain fine particles.

Fine powder of amino acid obtained by pulverizing coarse amino acid powder together with dimethylformamide in a wet ball mill is substantially uniform in particle size and contains very little of either the over-pulverized or under-pulverized particles. The powder is fit for practical use.

Pulverization and classification of coarse amino acid powder by a dry process such as using jet mill results in still finer particles of uniform size that are highly suitable for practical use.

Because of the low molecular weight, the yield of pulverization per unit hour of amino acid particles is larger than the maximum yield obtained in the gelatin particles regardless of whether the process is dry or wet. The amino acid particles can be put to practical use without problem in terms of the yield of pulverization per unit hour, too.

Moreover, because of the particularly low molecular weight of the coarse powder which is in the range of 100-200, amino acid particles obtained therefrom are highly uniform in particle size. According to one example wherein coarse powder of amino acid having the mean molecular weight of 200 was pulverized, there were no particles that were greater than 9 μm or smaller than 1.5 μm in size, and the particles were substantially uniform and of the mean size.

Amino acid used in the present invention is obtained by hydrolysis of proteins such as those contained in degreased soybean, wheat, dregs of peanut, rapeseed and cotton seed oils, corn, cow milk, egg white and fish and animal meat, and keratin contained in human hair or wool with enzyme, acid or alkali. Amino acid to be used in the present invention has the mean molecular weight of from 100 to 200 but contains no polypeptide bonds. The composition of amino acid herein may therefore vary depending on the starting material used. Amino acids of any composition may be put to practical use according to the present invention.

Particles of gelatin and amino acid are obtained by pulverizing coarse powders thereof.

In the case of dry process, coarse powder of gelatin and amino acid is pulverized in a sufficiently dry atmosphere to prevent coagulation of particles.

Moisture contents of the coarse powder to be pulverized, of the pulverization atmosphere, and of air in the case of pulverization in a jet mill are respectively selected as relative to each other, provided that the coarse powder to be pulverized as well as the pulverization atmosphere is dry enough to prevent coagulation of particles.

Based on repeated experiments, pulverization according to the present invention is carried out under conditions which will keep the moisture content of the coarse powder at 11 wt % or less, more specifically at 10 wt % or less and still more preferably at 6 wt % or less.

If the moisture content of the coarse powder exceeds 11 wt %, the powder tends to become coagulated, packed or adhered to the pulverizer, making the pulverization impossible. The resultant particles will vary greatly in the particle size and thus will not be suitable for practical use.

If the moisture contained in the coarse powder is completely removed therefrom during pulverization or if the content becomes extremely low, the coarse powder of gelatin or amino acid will fail to swell with water or fail to be eluted in water. Therefore, the moisture content of the coarse powder is preferably 0.5 wt % or more.

The preferable range of moisture content in the coarse powder to be pulverized is from 0.5 to 11 wt %, and more preferably between 1 and 5 wt %, during pulverization.

In the case of pulverization in a jet mill, the coarse powder typically contains 5 wt % or less of moisture. It is also preferable to use dry air at the absolute humidity of 0.002 kgH$_2$O/kgDA or lower (dry air DA containing 0.002 kg of moisture per 1 kg of DA).

A jet mill is preferable for dry process pulverization. Particularly, a jet mill incorporated with a classification device is conveniently used for continuous operation of pulverization and classification.

In one example of the present invention, coarse powder is fed at the bottom of a pulverizing chamber of a jet mill and air is injected from nozzles provided on the peripheral wall of the pulverizing chamber to cause the powder to fly in the chamber. By accelerating the flow of the powder with jet air, particles are caused to impinge against one another for pulverization. Fine particles thus obtained are then blown upward into a classification rotor. Fine particles classified by the classification rotor are trapped by a suction blower, while coarse powder not yet pulverized comes down by its own weight along the inner wall of the pulverizing chamber to be flown again as mentioned above.

The jet mill used in this example includes nozzles of 4 mm diameter, and is capable of sending air at the nozzle gauge pressure of 6 kg/cm$^2$ at the rate of 3.2 m$^3$/min (converted in atmospheric pressure).

The classification rotor incorporated in the jet mill operates at 9,000 rpm with the amount of suction of the blower at 4 m$^3$/min (converted into atmospheric pressure) in the pulverizing chamber at the pressure of 0.07 mmAq.

Jet mills of the type other than the one mentioned above may be used to pulverize and classify coarse powder. Pulverizers for dry process other than jet mill may also be used. Further, pulverization and classification may be conducted separately. It is therefore possible to use a pulverizer such as a ball mill which relies on mechanical crashing, while using a classifying device which classifies particles with air according to the true specific gravity or using a filter which classifies the particles by volume.

Dry process pulverization is of particular significance if the coarse powder to be pulverized and classified is gelatin. Pulverization of gelatin in a wet ball mill or the like would disadvantageously result in a mixture of particles of greatly varying sizes. This disadvantage would arise even if the conditions are changed to obtain smaller mean particle size.

Use of jet mill, on the other hand, results in particles with uniform particle size distribution, and particles that are too large or too small as compared with the mean size are effectively eliminated.

Graph D in FIG. 2 shows the particle size distribution of the coarse gelatin powder to be pulverized; graph E the particle size distribution of the pulverized and classified gelatin particles; graph F the particle size distribution of gelatin particles obtained by pulverization of another gelatin powder in a wet ball mill. The ordinate represents the amount of distribution in wt %, and the abscissa the particle size in $\mu$m.

As is clear from these graphs, gelatin particles pulverized by the wet process and classified to the particle size of 15 $\mu$m or smaller contained as much as 65 wt % of particles smaller than 2.0 $\mu$m and more than 20 wt % of particles smaller than 0.5 $\mu$m which are not usable as against the total amount.

When the wet process pulverization is employed to obtain particles smaller than 10 $\mu$m, the amount of particles smaller than 0.5 $\mu$m becomes too large, and the particles are not suitable for use in combination with resins.

When resin is blended with particles that are too fine, the resultant coating layer may not exhibit the moisture absorption and permeation performances that are unique to gelatin. The particles are likely not to be removed from the coating layer by elution.

Therefore according to this example, coarse gelatin powder is subjected to dry process pulverization, and more specifically pulverization in a jet mill to obtain gelatin particles for use in combination with resins.

Amino acid particles to be used in the present invention are obtained by hydrolysis from amino acids having a mean molecular weight of 100-200. Uniform particle size distribution is obtained either by the wet or the dry process. Amino acid particles obtained by the wet process pulverization may be used equally well.

In view of the foregoing, amino acid particles can be obtained by mixing the coarse amino acid powder with an organic solvent such as dimethylformamide, charging the mixture into a wet ball mill and pulverizing in an atmosphere where the moisture content of the coarse powder will not increase.

Particles of gelatin or amino acid thus obtained maintain the properties unique thereto and are of uniform particle size distribution, and are therefore very suitable for use in combination with resins.

EXAMPLE 1

A counter-jet mill was used. Coarse powder was fed at the bottom of the pulverizing chamber of the mill and flown inside the chamber by injecting jet air from nozzles provided along the peripheral wall of the chamber. By accelerating the flow of the powder with jet air to cause particles to impinge against one another for pulverization. The particles thus pulverized were sent upward with air stream into the classifying rotor, and then trapped by the suction blower, while the coarse particles which remained unpulverized came down by their own weight along the inner wall of the chamber to be flown again. The coarse gelatin powder used had the mean molecular weight of 1,000.

The mean particle size of the coarse gelatin powder was ca. 42 $\mu$m, with the maximum size ca. 200 $\mu$m, and the moisture content was adjusted to be 5 wt %.

Pulverization was conducted by injecting dry air with the moisture content of 0.002 kg per kg of the air at the rate of 3.2 m$^3$/min continuously from nozzles of 4 mm diameter by the pressure of 6 kg/cm$^2$. The rotor was rotated at the rate of 9,000 rpm, the suction blower operated at the rate of 4 m$^3$/min in the pulverizing chamber maintained at the pressure of 0.07 mmAq.

The yield of gelatin particles was 5 kg, with the mean particle size of 4.32 $\mu$m. Particles larger than 9 $\mu$m were not included, and the amount of particles smaller than 1.5 $\mu$m was 3.8 wt % as against the total amount. The particles were suitable for use in combination with resins.

The particle size distribution as shown in the graph E in FIG. 2 is as follows:

| | |
|---|---|
| smaller than 1.5 $\mu$m | 3.8 wt % |
| larger than 1.5 $\mu$m smaller than 3.0 $\mu$m | 22.0 wt % |
| larger than 3.0 $\mu$m smaller than 4.5 $\mu$m | 27.4 wt % |
| larger than 4.5 $\mu$m smaller than 6.0 $\mu$m | 33.8 wt % |
| larger than 6.0 $\mu$m smaller than 7.5 $\mu$m | 9.7 wt % |
| larger than 7.5 $\mu$m smaller than 9.0 $\mu$m | 3.3 wt % |
| larger than 9.0 $\mu$m | 0.0 wt % |

EXAMPLE 2

Pulverization was conducted under the identical conditions as in Example 1 except that the coarse gelatin powder used had the mean particle size of 50 $\mu$m with the maximum size of ca. 200 $\mu$m and the mean molecular weight of 3,000.

The yield of gelatin particles per hour was 4.2 kg, and the mean particle size was as small as 3.89 $\mu$m. The amount of particles larger than 9 $\mu$m was 1.9 wt % and that of particles smaller than 1.5 μm was 3.1 wt % or less as against the total amount. The particles were suitable for use in combination with resins.

The particle size distribution thereof is as follows:

| | |
|---|---|
| smaller than 1.5 μm | 3.1 wt % |
| larger than 1.5 μm smaller than 3.0 μm | 19.8 wt % |
| larger than 3.0 μm smaller than 4.5 μm | 45.3 wt % |
| larger than 4.5 μm smaller than 6.0 μm | 13.8 wt % |
| larger than 6.0 μm smaller than 7.5 μm | 9.0 wt % |
| larger than 7.5 μm smaller than 9.0 μm | 7.1 wt % |
| larger than 9.0 μm smaller than 10.5 μm | 1.9 wt % |
| larger than 10.5 μm | 0.0 wt % |

EXAMPLE 3

Pulverization was conducted under the identical conditions as in Example 1 except that the coarse gelatin powder used had the mean particle size of 45 μm, the maximum size of ca. 200 μm, and the mean molecular weight of 7,000.

The yield of gelatin particles per hour was 3.8 kg, and the mean particle size was 4.44 μm which is smaller than 5 μm. The amount of particles of the size larger than 9 μm was as low as 3.9 wt % and that of particles smalller than 1.5 μm was even as low as 2.8 wt % as against the total amount. The particles were suitable for use in combination with resins.

The particle size distribution thereof is as follows:

| | |
|---|---|
| smaller than 1.5 μm | 2.8 wt % |
| larger than 1.5 μm smaller than 3.0 μm | 19.1 wt % |
| larger than 3.0 μm smaller than 4.5 μm | 28.5 wt % |
| larger than 4.5 μm smaller than 6.0 μm | 17.7 wt % |
| larger than 6.0 μm smaller than 7.5 μm | 16.1 wt % |
| larger than 7.5 μm smaller than 9.0 μm | 11.9 wt % |
| larger than 9.0 μm smaller than 10.5 μm | 3.9 wt % |
| larger than 10.5 μm | 0.0 wt % |

EXAMPLE 4

Pulverization was conducted under the identical conditions as in Example 1 except that the coarse gelatin powder used had the mean particle size of 50 μm, the maximum size of ca. 200 μm, and the mean molecular weight of 8,500.

The yield of gelatin particles per hour was slightly low at 3.1 kg but was sufficiently high for the cost involved. The mean particle size was 4.77 μm which is smaller than 5 μm. The amount of particles larger than 9 μm was low at 4.5 wt %, and that of particles smaller than 1.5 μm was low at 1.6 wt % as well. The particles were suitable for use in combination with resins.

The particle size distribution thereof is as follows:

| | |
|---|---|
| smaller than 1.5 μm | 1.6 wt % |
| larger than 1.5 μm smaller than 3.0 μm | 16.2 wt % |
| larger than 3.0 μm smaller than 4.5 μm | 28.5 wt % |
| larger than 4.5 μm smaller than 6.0 μm | 20.5 wt % |
| larger than 6.0 μm smaller than 7.5 μm | 16.0 wt % |
| larger than 7.5 μm smaller than 9.0 μm | 12.7 wt % |
| larger than 9.0 μm smaller than 10.5 μm | 4.5 wt % |
| larger than 10.5 μm | 0.0 wt % |

COMPARATIVE EXAMPLE 1

Pulverization was conducted under the identical conditions as in Example 1 except that the coarse gelatin powder used had the mean particle size of 50 μm, the maximum size of ca. 200 μm, and the mean molecular weight of 10,000.

The yield of gelatin particles per hour in Comparative Example 1 was as low as 1.4 kg, which is not practical in terms of cost. Although the amount of particles smaller than 1.5 μm was small at 1.7 wt % as against the total amount, the amount of particles larger than 9 μm was as high as 24.9 wt %. The mean particle size was 5.85 μm which is larger than 5 μm. The particles were not suitable for use in combination with resins in terms of particle size as well.

The particle size distribution thereof is as follows:

| | |
|---|---|
| smaller than 1.5 μm | 1.7 wt % |
| larger than 1.5 μm smaller than 3.0 μm | 10.4 wt % |
| larger than 3.0 μm smaller than 4.5 μm | 21.3 wt % |
| larger than 4.5 μm smaller than 6.0 μm | 18.5 wt % |
| larger than 6.0 μm smaller than 7.5 μm | 7.9 wt % |
| larger than 7.5 μm smaller than 9.0 μm | 15.3 wt % |
| larger than 9.0 μm smaller than 10.5 μm | 7.0 wt % |
| larger than 10.5 μm smaller than 12.0 μm | 7.9 wt % |
| larger than 12.0 μm smaller than 13.5 μm | 6.8 wt % |
| larger than 13.5 μm smaller than 15.0 μm | 3.2 wt % |
| larger than 15.0 μm | 0.0 wt % |

COMPARATIVE EXAMPLE 2

Pulverization was conducted under the identical conditions as in Example 1 except that the coarse gelatin powder used had the mean particle size of 45 μm, the maximum size of ca. 200 μm, and the mean molecular weight of 13,000.

The yield of gelatin particles per hour in Comparative Example 2 was as low as 0.8 kg, which is not practical in terms of cost. Although there were no particles that were smaller than 1.5 μm, the amount of particles larger than 9 μm was high at 33 wt %. The mean particle size was 7.46 μm. The particles were not suitable for use in combination with resins in terms of particle size.

The particle size distribution thereof is as follows:

| | |
|---|---|
| smaller than 1.5 μm | 0.0 wt % |
| larger than 1.5 μm smaller than 3.0 μm | 0.7 wt % |
| larger than 3.0 μm smaller than 4.5 μm | 17.3 wt % |
| larger than 4.5 μm smaller than 6.0 μm | 15.0 wt % |
| larger than 6.0 μm smaller than 7.5 μm | 17.5 wt % |
| larger than 7.5 μm smaller than 9.0 μm | 16.5 wt % |
| larger than 9.0 μm smaller than 10.5 μm | 9.5 wt % |
| larger than 10.5 μm smaller than 12.0 μm | 10.1 wt % |
| larger than 12.0 μm smaller than 13.5 μm | 9.1 wt % |
| larger than 13.5 μm smaller than 15.0 μm | 4.3 wt % |
| larger than 15.0 μm | 0.0 wt % |

COMPARATIVE EXAMPLE 3

Pulverization was conducted under the identical conditions as in Comparative Example 1 except the speed of the rotor of the classifying device was set at 11,000 rpm.

The mean particle size obtained in this comparative example was small at 4.35 μm, and there were no particles that were larger than 9 μm. The amount of particles smaller than 1.5 μm was also as small as 1.7 wt %. The particles were therefore suitable in terms of particle size. However, the yield per hour was only 0.77 kg, which was not practical in terms of cost.

The particle size distribution thereof is as follows:

| | |
|---|---|
| smaller than 1.5 μm | 1.7 wt % |
| larger than 1.5 μm smaller than 3.0 μm | 19.5 wt % |

| | |
|---|---|
| larger than 3.0 μm smaller than 4.5 μm | 32.1 wt % |
| larger than 4.5 μm smaller than 6.0 μm | 26.3 wt % |
| larger than 6.0 μm smaller than 7.5 μm | 19.1 wt % |
| larger than 7.5 μm smaller than 9.0 μm | 1.3 wt % |
| larger than 9.0 μm | 0.0 wt % |

COMPARATIVE EXAMPLE 4

Pulverization was conducted under the identical conditions as in Comparative Example 2 except the speed of the rotor of the classifying device was set at 11,000 rpm.

The particle size obtained in this comparative example was small at 4.51 μm, and the amount of particles that were larger than 9μm was very small at 0.8 wt % as against the total amount. The amount of particles smaller than 1.5 μm was also small at 1.6 wt %, and the particles were suitable for use in combination with resins. However, the yield per hour was only 0.44 kg, which was not practical in terms of cost.

The particle size distribution thereof is as follows:

| | |
|---|---|
| smaller than 1.5 μm | 1.6 wt % |
| larger than 1.5 μm smaller than 3.0 μm | 16.5 wt % |
| larger than 3.0 μm smaller than 4.5 μm | 31.6 wt % |
| larger than 4.5 μm smaller than 6.0 μm | 27.1 wt % |
| larger than 6.0 μm smaller than 7.5 μm | 21.0 wt % |
| larger than 7.5 μm smaller than 9.0 μm | 1.4 wt % |
| larger than 9.0 μm | 0.8 wt % |

EXAMPLE 5

Pulverization was conducted under the identical conditions as in Example 1 using coarse powder of amino acid having the mean molecular weight of 100 to 200 and the moisture content thereof being adjusted to 5 wt % or less. Classification was also conducted under the identical conditions as in Example 1 except the speed of the rotor of the classifying device was set at 7,000 rpm.

The particles obtained in this example were within the range of from 1 μm to 10 μm in size with the mean particle size of 4.50 μm and were therefore suitable for use in combination with resins. Moreover, the yield per hour was 6.8 kg, which was particularly practical in terms of cost.

When the number of revolution of the rotor was increased to 9,000 rpm for pulverization and classification of amino acid in the form of coarse powder, the resultant particles were uniform in particle size which was substantially smaller than 8 μm. The amount of particles smaller than 1 μm was also very small and the mean particle size was 3.70 μm. The particles were suitable for use in combination with resins. The yield per hour was 6.1 kg, which was practical in terms of cost.

EXAMPLE 6

Coarse powder of amino acid obtained by hydrolysis of gelatin having the mean molecular weight of 100 to 200 was dried to adjust its water content to be 6 wt % or less. Powder in an amount of 600 g was charged in a 5.4 l ball mill filled with 2.4 l of 3 mmφ ceramic balls together with 1,200 g of dimethylformamide and subjected to pulverization in a dry atmosphere. The mean particle size became ca. 2 μm in 15 to 30 minutes, with hardly any particles that were larger than 8 μm remaining in the system. The particles of amino acid thus obtained were suitable for use in combination with resins and practical in terms of cost.

Particles of amino acid obtained in this example were uniformly dispersed in dimethylformamide, and this solvent dispersed with amino acid particles is suitable for dissolving polyurethane resin.

COMPARATIVE EXAMPLE 5

Pulverization was conducted under the identical conditions as in Example 6 except that the coarse powder of gelatin used had the mean molecular weight of 100,000 and the mean particle size of 50 μm with the maximum size of ca 200 μm and that the pulverization was continued for 60 minutes.

The amount of particles smaller than 2 μm in this comparative example was large at 65.1 wt %, and that of particles larger than 10 μm was 1.1 wt % as against the total amount. The particles were not suitable for use in combination with resins. The yield per unit hour was very low, which made the particles unpractical in terms of cost.

The particle size distribution shown in the graph F in FIG. 2 is as follows:

| | |
|---|---|
| smaller than 2 μm | 65.1 wt % |
| larger than 2 μm smaller than 4 μm | 23.2 wt % |
| larger than 4 μm smaller than 6 μm | 5.9 wt % |
| larger than 6 μm smaller than 8 μm | 3.3 wt % |
| larger than 8 μm smaller than 10 μm | 1.4 wt % |
| larger than 10 μm smaller than 12 μm | 0.7 wt % |
| larger than 12 μm smaller than 14 μm | 0.3 wt % |
| larger than 14 μm | 0.1 wt % |

Particles of gelatin and amino acid thus obtained have optimum properties suitable for use in combination with resins. Because of high efficiency in pulverization, intrinsic properties of gelatin or amino acid remain intact without denaturation. Because of uniform particle size within a given range, these particles may be distributed evenly in the resin matrix when used in combination therewith and will give moisture absorption and permeation performance and good feel to the entire surface of the resultant coating layer. By eluting these particles from the coating layer, micropores of uniform size can be formed on the surface of the coating layer to give moisture and air permeability as well as uniform texture.

Resins to be blended with the particles of gelatin or amino acid may be natural or synthetic resin. Method of blending can also be selected arbitrarily. For example, particles are typically mixed with hydrophilic solvent to obtain a dispersion, and the dispersion is used to prepare solutions with various types of resins which in turn will be used as paint, coating, adhesive, etc. Resins blended with the particles of gelatin or amino acid may be used to form any kind of products that are made of resin in general. For example, they are used to form paints, adhesives, coating, sheets and films in general, tubes as well as various other resin moldings obtained by different molding processes such as injection, blowing, rotational molding, and slush molding.

Particles of gelatin or amino acid contained in such resin products can be eluted therefrom by immersing the products in warm or cold water, leaving microporous structure on the surface of the resin products. Elution of the particles is carried out more effectively by impregnating the products with an organic solvent having the mean molecular weight of 80 or less and more preferably less than 60 such as methyl alcohol or ethyl alcohol and then immersing the same in water.

Gelatin or amino acid particles obtained in this Example 1~6 can be eluted with water more efficiently than those obtained in Comparative Example 5, and the pores formed by elution are more uniform in size and shape.

EXAMPLE 7

A polyurethane solution was prepared by blending 50 wt parts of gelatin particles obtained in Example 1 with 100 wt parts of polyurethane resin as calculated in terms of its solid content. The solution was used to form a 15 μm thick film.

The film was rubbed in warm water at 80° C. for 20 minutes to elute the gelatin particles to obtain a porous film. Moisture permeability of the film was 8,500 g/m².24 hr.

COMPARATIVE EXAMPLE 6

A porous film was obtained similarly as in Example 7 except that particles of sodium chloride were used instead of gelatin particles. Particles of sodium chloride were eluted from the film to a level equal to that of gelatin particles in Example 7. Moisture permeability of this film was 4,200 g/m².24 hr, which was lower than the porous film obtained by eluting gelatin particles.

EXAMPLE 8

Gelatin particles obtained in Example 4 were blended with dimethylformamide. A coating solution was prepared by blending said mixture to a urethane solution with the solid content of 30% in such an amount that the ratio of gelatin particles would be 10–30 wt parts as against 100 wt parts of the urethane solution. The coating solution was applied on a knit fabric to a thickness of 10–30 μm using a doctor knife, dried with hot air of 110°–130° C. for 2–3 minutes. Drying was conducted with care as denaturation of gelatin particles would occur if the temperature of hot air exceeded 150° C.

The knit fabric was then rubbed in hot water at 60°–90° C. Mechanical washing using a device such as wince and nip roll may be employed instead of rubbing. Washing in hot water was optimally conducted for 30 minutes, leaving ca. 7 wt % of gelatin particles in the fabric. The moisture permeable fabric thus obtained had good feel and sufficient moisture and air permeability.

EXAMPLE 9

Gelatin particles obtained in Example 2 were blended in dimethylformamide. A coating solution was prepared by blending said mixture to a urethane solution with the solid content of 30% in such an amount that the ratio of gelatin particles would be 30–50 wt parts as against 100 wt parts of the urethane solution. The coating solution was applied on a release paper for a thickness of 10–30 μm to obtain a laminate film.

One-pack urethane adhesive containing 15–25 g of gelatin as against 100 g of urethane was applied on the laminate film using a roll, and the laminate film was pasted on a substrate, pressed with a hot roll at 120° C. and then cured for 24 hours.

The substrate was rubbed in hot water at 60°–90° C. for 30 minutes to obtain a moisture permeable waterproof cloth.

The moisture permeable waterproof cloth thus obtained had good feel and excellent moisture and air permeability.

EXAMPLE 10

Gelatin particles obtained in Example 3 were blended with 100 g of a urethane resin in an amount of 30–70 g to prepare a one- or two-pack in-mold coating solution.

An outer surface releasing agent (EMR) was coated on the surface of a die heated to 50° C. and then the in-mold coating solution was sprayed for a thickness of 20–50 μm and dried. The die was closed, charged with foaming polyurethane in 3 seconds to obtain a foamed molding.

The skin layer of the molding contained gelatin particles and had an excellent grip without stickiness.

EXAMPLE 11

A molding was obtained similarly as in Example 10 except that particles of amino acid obtained in Example 5 were used.

The surface of the molding was dry and good to the feel.

The molding was rinsed in warm water at 80°–90° C. for 15 minutes and dried in an oven at 80° C. The skin layer of the molding had a porous structure.

EXAMPLE 12

A moisture permeable waterproof cloth was obtained similarly as in Example 9 except that particles of amino acid obtained in Example 6 were used.

The moisture permeable waterproof obtained in this example were excellent in moisture and air permeability and had sufficient water pressure resistance.

COMPARATIVE EXAMPLE 7

A porous film was obtained similarly as in Example 7 except that gelatin particles obtained in Comparative Example 5 were used.

The porous film obtained in this example contained a large amount of gelatin despite rubbing in warm water, and the film was not suitable as moisture permeable film because of its extremely low moisture permeability.

What is claimed is:

1. A gelatin particle mixture comprising:
   a) a gelatin particle mixture including 0 to 10 weight % of gelatin particles having a size range of 9.0 μm and larger;
   b) said gelatin particle mixture including 0 to 10 weight % of gelatin particles having a size range of 1.5 μm and smaller;
   c) said gelatin particle mixture including more than 80 weight % of gelatin particles having a size range larger than 1.5 μm and smaller than about 9.0 μm; and
   d) wherein said gelatin particles in said gelatin particle mixture are pulverized into said size ranges from a gelatin starting material having an average molecular weight of less than 8500 daltons.

2. The mixture of claim 1, wherein:
   a) the gelatin particles in said mixture have a mean particle size of 3.0 to 5.5 μm.

3. The mixture of claim 1, and including:
   a) an amount of a natural or synthetic resin admixed with said mixture.

* * * * *